US012509336B2

(12) United States Patent
Barlow et al.

(10) Patent No.: US 12,509,336 B2
(45) Date of Patent: Dec. 30, 2025

(54) SYSTEM AND METHOD FOR INSTALLING INSULATED METAL PANELS

(71) Applicant: Innovatech Systems, LLC, Kanarraville, UT (US)

(72) Inventors: James Barlow, Kanarraville, UT (US); James Harker, Kanarraville, UT (US)

(73) Assignee: Innovatech Systems, LLC, Kanaraville, UT (US)

( * ) Notice: Subject to any disclaimer, the term of this patent is extended or adjusted under 35 U.S.C. 154(b) by 461 days.

(21) Appl. No.: 18/145,293

(22) Filed: Dec. 22, 2022

(65) Prior Publication Data

US 2023/0192460 A1 Jun. 22, 2023

Related U.S. Application Data

(60) Provisional application No. 63/292,787, filed on Dec. 22, 2021.

(51) Int. Cl.

| | |
|---|---|
| ***B66F 9/075*** | (2006.01) |
| ***B66F 9/065*** | (2006.01) |
| ***B66F 9/22*** | (2006.01) |

(52) U.S. Cl.

CPC ........ *B66F 9/07504* (2013.01); *B66F 9/0655* (2013.01); *B66F 9/22* (2013.01)

(58) Field of Classification Search

CPC ....... B66F 9/07504; B66F 9/0655; B66F 9/22

See application file for complete search history.

(56) References Cited

U.S. PATENT DOCUMENTS 5,073,077 A 12/1991 Altman
6,336,565 B1 * 1/2002 Merkel .................. B66F 9/061 212/180
6,742,245 B2 * 6/2004 Glenn .................. B27M 3/0073 29/897.3
6,776,571 B2 * 8/2004 Riffle ...................... E02F 3/963 37/468
6,986,204 B2 * 1/2006 Glenn .................. B27M 3/0073 29/897.3
7,350,467 B2 * 4/2008 Green ..................... E01B 29/05 104/7.1

(Continued)

FOREIGN PATENT DOCUMENTS

CN 104444757 A 3/2015

*Primary Examiner* — Saul Rodriguez
*Assistant Examiner* — Ashley K Romano
(74) *Attorney, Agent, or Firm* — Gurr & Brande, PLLC; Robert A. Gurr

(57) ABSTRACT

An insulated metal panel (IMP) assembly system includes a panel assembly table and a boom IMP attachment. The panel assembly table allows for assembly of a panel module at ground level. The boom IMP attachment features a quick-coupler couplable to the boom of a telehandler, a swivel coupler column, one or more tilt linear actuators configured to tilt the orientation of a panel module, and one or more hydraulic rotation linear actuators configured to rotate the orientation of the panel module. The boom IMP attachment also includes a jib frame, a plurality of jib arms spanning outwards from the jib frame, and one or more clamp header rails having a plurality of clamp assemblies, each configured to grip a frame member of the panel frame of the panel module. The boom IMP attachment may hoist, tilt, and rotate the panel module.

13 Claims, 16 Drawing Sheets

(56) References Cited

U.S. PATENT DOCUMENTS

| | | | | |
|---|---|---|---|---|
| 9,457,999 | B2 * | 10/2016 | Belotti | B66F 9/12 |
| 10,427,916 | B1 * | 10/2019 | Fisher | B66C 23/36 |
| 10,633,812 | B1 * | 4/2020 | Fisher | E02B 7/28 |
| 10,633,887 | B1 * | 4/2020 | Fisher | E04H 17/263 |
| 10,655,347 | B2 * | 5/2020 | Fisher | E04G 11/20 |
| 11,105,116 | B1 * | 8/2021 | Fisher | E04H 17/24 |
| 11,919,149 | B2 * | 3/2024 | Zhou | B25J 19/0054 |
| 11,964,860 | B2 * | 4/2024 | Bailey | B66F 9/0755 |
| 12,098,561 | B2 * | 9/2024 | Barlow | E04G 21/26 |
| 2003/0172516 | A1 | 9/2003 | Glenn | |
| 2020/0018059 | A1 | 1/2020 | Barlow et al. | |
| 2022/0069770 | A1 | 3/2022 | Shelton et al. | |

* cited by examiner

SYSTEM AND METHOD FOR INSTALLING INSULATED METAL PANELS

CROSS-REFERENCE TO RELATED APPLICATIONS

This application claims the benefit of U.S. Provisional Application Ser. No. 63/292,787, filed on Dec. 22, 2021, which is incorporated herein by reference.

TECHNICAL FIELD

The present disclosure relates, generally, to building construction. In particular, the present disclosure relates to a panelization system allowing for the ground assembly of suspended building components (e.g., I-beams and panels) and the placement of the assembled panel modules using a clamp attachment for the boom of a telehandler.

BACKGROUND

With the construction of taller and multi-level warehouses and distribution centers, material selection has shifted from concrete pre-cast and tilt wall products to insulated metal panels (IMPs). IMPs are exterior wall and roof panels often with steel skins and an insulating foam core, known for their superior thermal properties, spanning capabilities, and comparatively quick installation, that together save costs compared to other wall assemblies. Currently in the art, several workers must be hoisted to high elevations, where the workers precariously assemble IMP sections together and fasten them to the building using complex parapet assemblies and wall girts. These installation methods, however, present scheduling challenges for concurrent and following trades because access to work zones are not available until that portion of the IMP scope is complete.

Likewise, the conventional IMP construction process presents many safety risks and efficiency challenges. Workers are required to handle IMP products at dangerous heights, which increases falling hazards that may result in injuries or death. Assembly of the walls is a slow process as IMP planks are hoisted by crane a few at a time and then individually mounted. This conventional process restricts access to the jobsite and thus affects the scope of other trades and the overall building schedule.

Accordingly, there is a need for a system and method that reduces falling hazards by performing assembly at ground level, that allows for maneuvering of the assembled IMP into position, and that increases the scheduling efficiency of the construction. The system and method for assembling and installing insulated metal panels disclosed herein solves these problems and others.

SUMMARY OF EXAMPLE EMBODIMENTS

In some embodiments, an IMP assembly system comprises a panel assembly table and a boom IMP attachment. The panel assembly table comprises a base frame, a track, a gantry movable along the track, a material deck movable along the track, a material lift arm coupled to the gantry and configured to collect IMP panel sections for placement on a panel frame. The panel assembly table may further comprise one or more panel jacks for lifting the panel module to allow access to an underside. The boom IMP attachment comprises a quick-coupler couplable to the boom of a telehandler, a swivel coupler column coupled to the swivel coupler, a first tilt linear actuator and a second tilt linear actuator configured to tilt the orientation of a panel module, a first hydraulic rotation linear actuator and a second hydraulic rotation linear actuator configured to rotate the orientation of the panel module, a hydraulic controller couplable to the telehandler, a jib frame, a plurality of jib arms, a first clamp header rail, a second clamp header rail opposite the first clamp header rail, and a plurality of clamp assemblies on each clamp header rail.

In some embodiments, the panel jacks support the panel frame while a panel module is being built, then lift the assembled panel module so the panel module can be accessed by the boom IMP attachment of the telehandler. The boom IMP attachment maneuvers the assembled panel module from the panel assembly table to a building for installation or to a crane for hoisting for installation. In some embodiments, the boom IMP attachment is capable of rotating the panel module one hundred and fifty degrees in horizontal position, and tilting the panel module one hundred and ten degrees to stand the panel module vertically, although not limited to these degrees.

DETAILED DESCRIPTION OF EXAMPLE EMBODIMENTS

Figure 1:
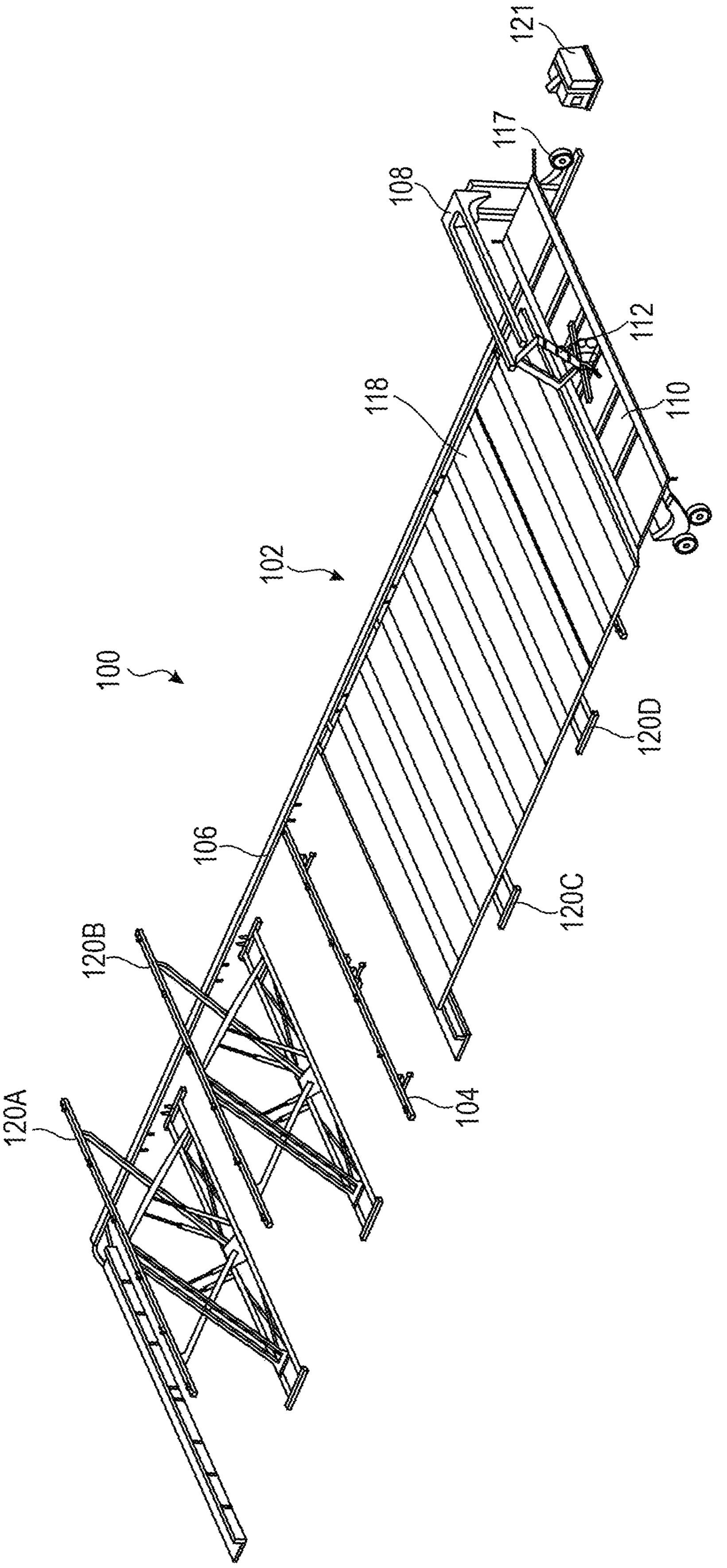
FIG. 1 illustrates a front, top, side perspective view of a panel assembly table with panel jacks and a gantry.
Figure 2:
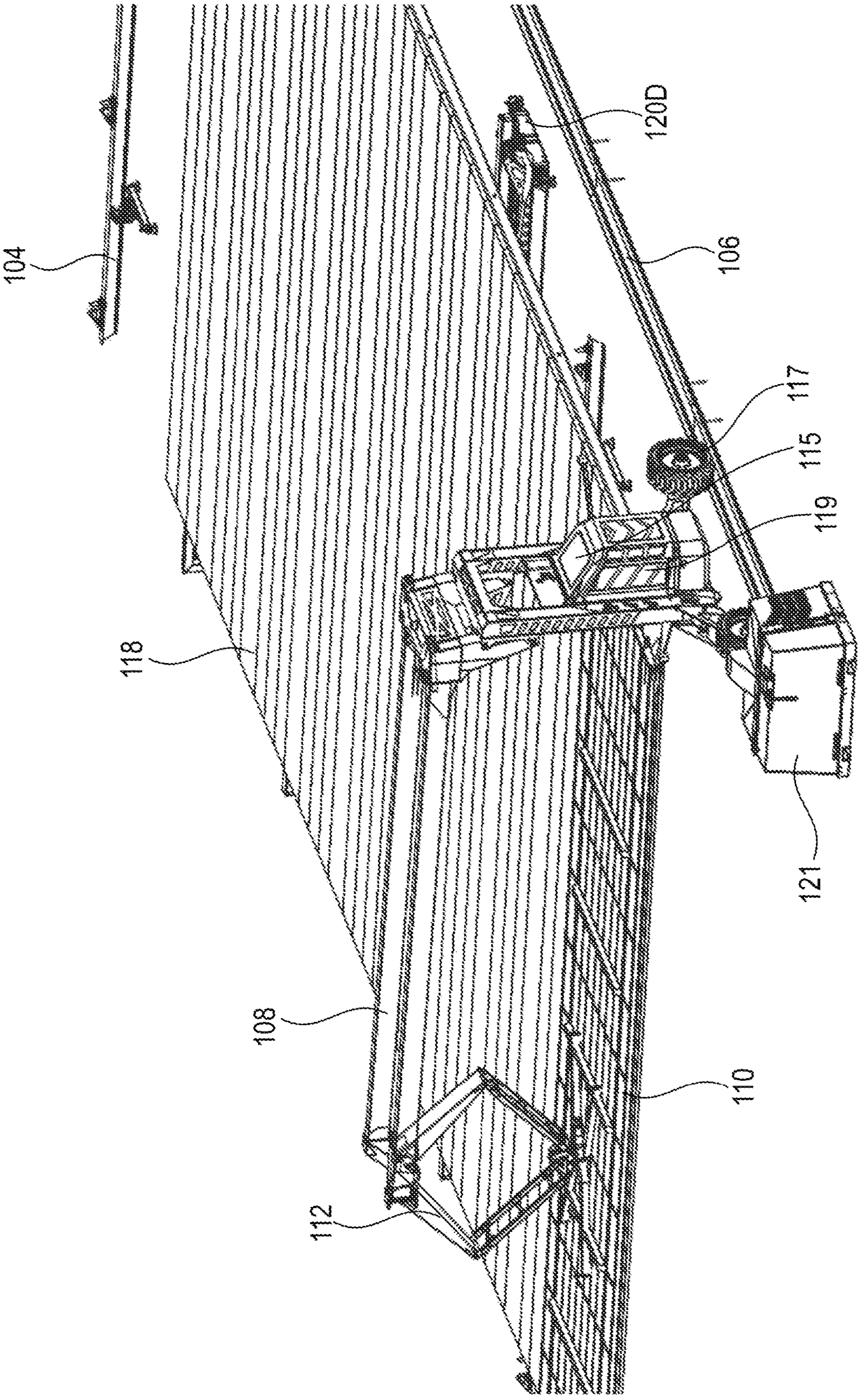
FIG. 2 illustrates a front, top, side perspective view of a panel assembly table with a gantry assembling a panel module.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

While the term "IMP wall module" is used throughout the present disclosure to refer to an assembled wall panel prepared for installation, the term may also denote one or more insulated metal panels, panel assemblies, or wall segments comprising metal, wood, plastic, glass, combinations thereof, or alternative construction materials.

As previously discussed, there is a need for a system and method for assembling and installing insulated metal panels that reduces falling hazards by performing greater assembly at ground level, and that optimizes the building scheduling efficiency amongst other trades on the jobsite. The IMP assembly system disclosed herein solves these problems and others.

Figure 3:
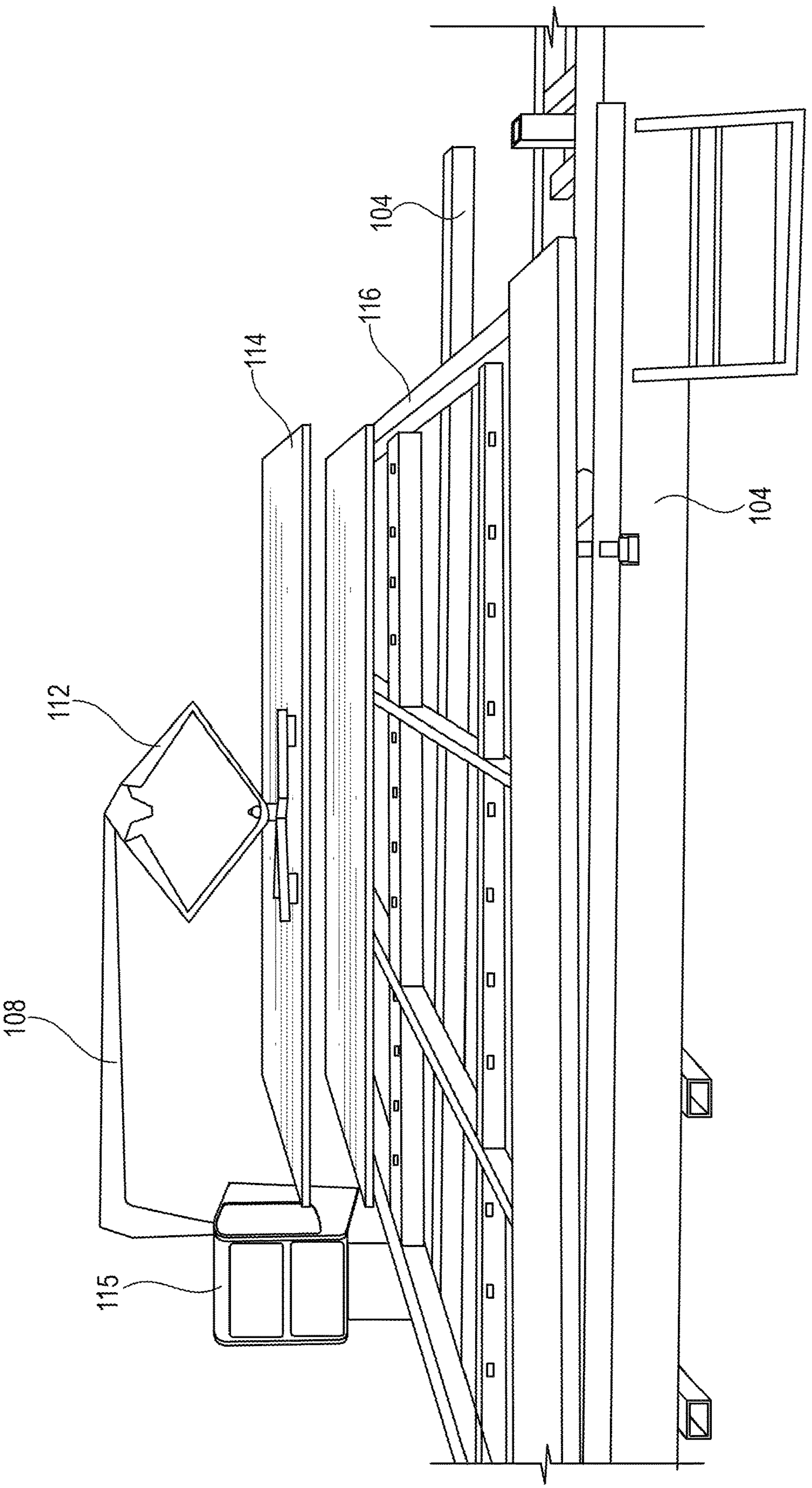
FIG. 3 illustrates a top, side perspective view of a panel assembly table.

In order to reduce falling hazards and the amount of work done at elevations, the process begins by assembling and IMP at ground level. The construction of the IMP may begin long before material delivery or other building activities happen on-site in order to enable the IMP assembly system to avoid scheduling conflicts with other construction projects concurrently being built on site. Accordingly, in some embodiments, as shown in FIGS. 1-16, an IMP assembly system 100 comprises a panel assembly table 102 comprising a base frame 104, a track 106, a gantry 108 movable along the track 106, a material deck 110 movable along the track 106, and a material lift arm 112 coupled to the gantry 108, the material lift arm 112 retrieving panel sections 114 (each panel section an individual insulated metal panel) (FIG. 3) from the material deck 110 to place on a panel frame 116 (e.g., steel beams), where the panel sections 114 may be secured to the panel frame 116 by one or more users on the ground, forming a panel module 118. In other words, the panel module 118 is a plurality of IMP panel sections 114 coupled to the panel frame 116. In some embodiments, the panel module 118 may comprise metal, wood, plastic, glass, combinations thereof, or alternative construction materials. Alternately, the panel module 118 may be installed as a segment of a wall, floor, roof, or other structural element.

The panel frame 116 may comprise a steel stud or tube substructure, such as frame members 113A-F (FIG. 10) coupled together, that supports the panel module 118 and that may be engineered on-site under the direction of a project engineer, in addition to other structural connections that may be required. The gantry 108 and the material lift arm 112 are controllable via a control station 115, which controls the material lift arm 112 and the gantry 108 via hydraulics and/or electric motors. For example, hydraulics may be used to control the material lift arm 112 while electric motors drive wheels 117 along the track 106. The control station 115 may comprise a generator for power generation and a hydraulic bank 119 and may further comprise microcontrollers, user interfaces (e.g., screens, buttons, joysticks, etc.), computer logic, or other controls. A separate generator 121 may also be used to supply needed power.

Figure 4:
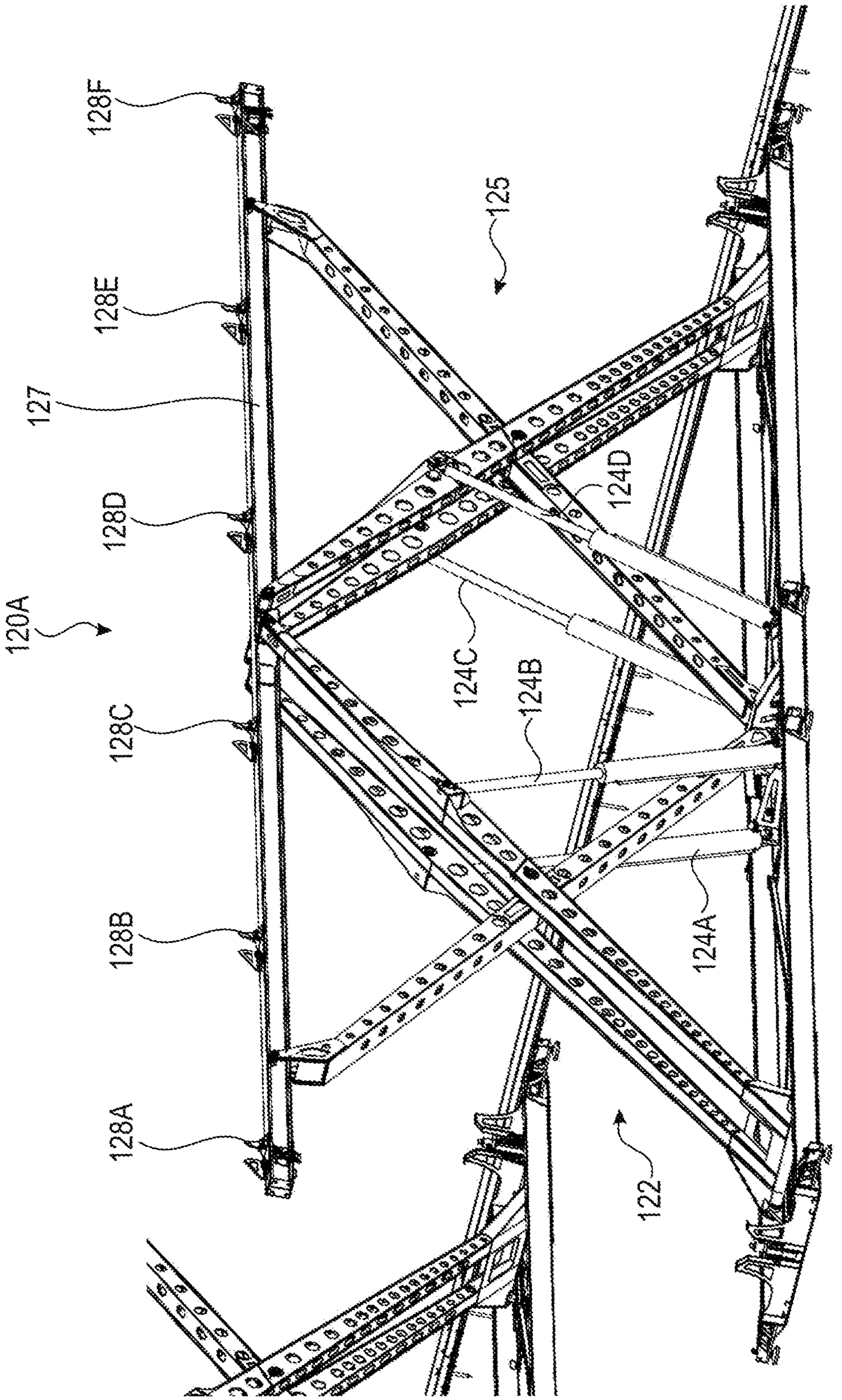
FIG. 4 illustrates a front, top, side perspective view of a panel jack.

Beneath each panel module 118 is at least one panel jack 120A-D, which may be positioned prior to assembly of the panel module 118, although they may also be positioned after assembly. As best shown in FIG. 4, each panel jack 120A-D comprises a first scissor lift 122 actuated by linear actuators 124A-B, and a second scissor lift 125 actuated by linear actuators 124C-D. It will be appreciated that the linear actuators 124A-D may be hydraulic or electric. The panel jack 120A-D may further comprise a frame mount 127 coupled to the scissor lifts 122, 125. The frame mount 127 may comprise a plurality of brackets 128A-F for receiving members of the panel frame 116, ensuring the panel frame 116 remains fixed while users assemble panel section 114 thereon. It will be appreciated that the number of brackets 128A-F may vary to accommodate the desired size of the panel module 118. The panel frame 116 may further be bolted otherwise temporarily secured to the brackets 128A-F of the frame mount 127 during assembly of the panel module 118 and lifting thereof, although not required.

Figure 5:
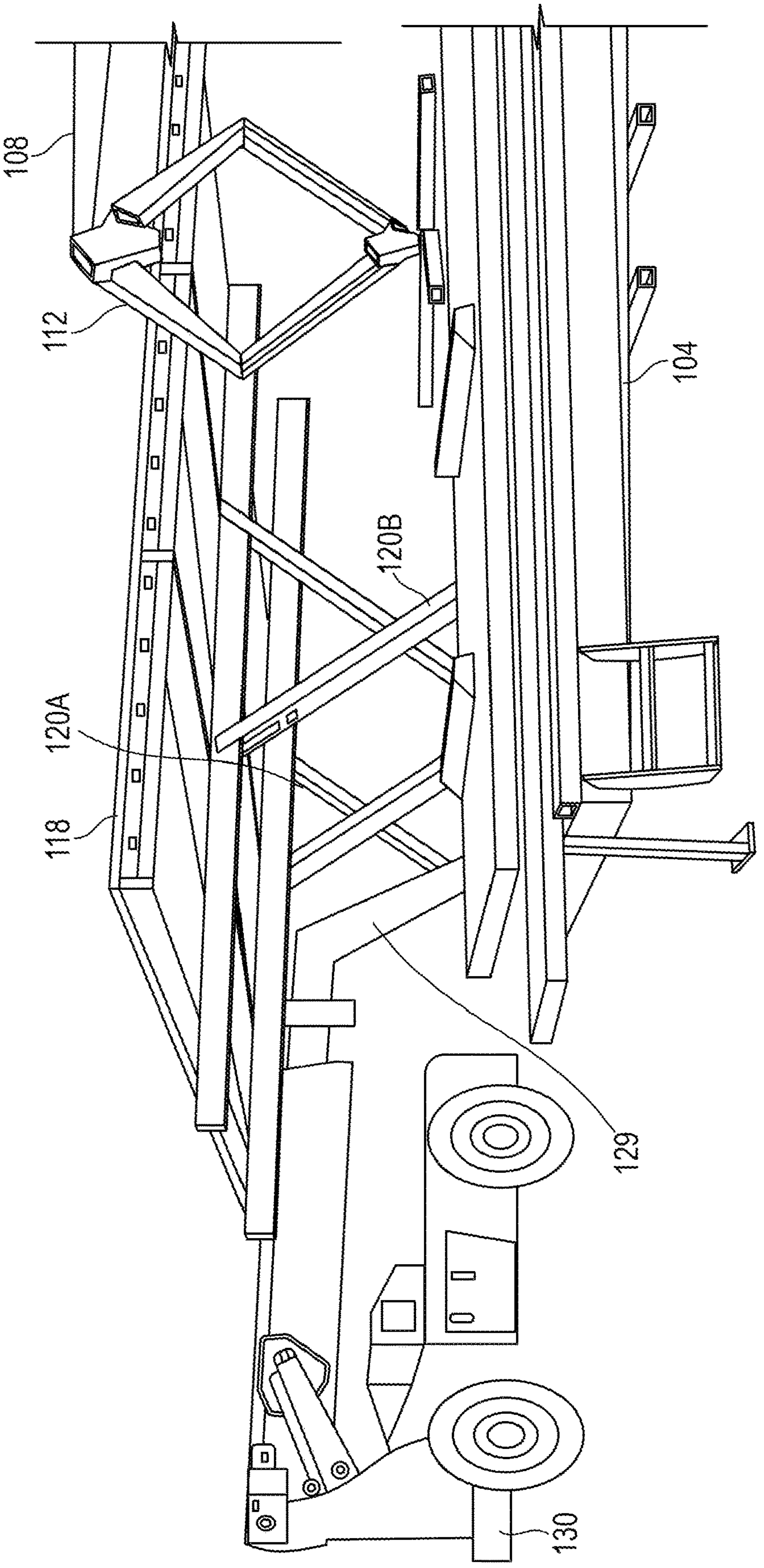
FIG. 5 illustrates a bottom, side, perspective view of panel jacks lifting a panel module.
Figure 6:
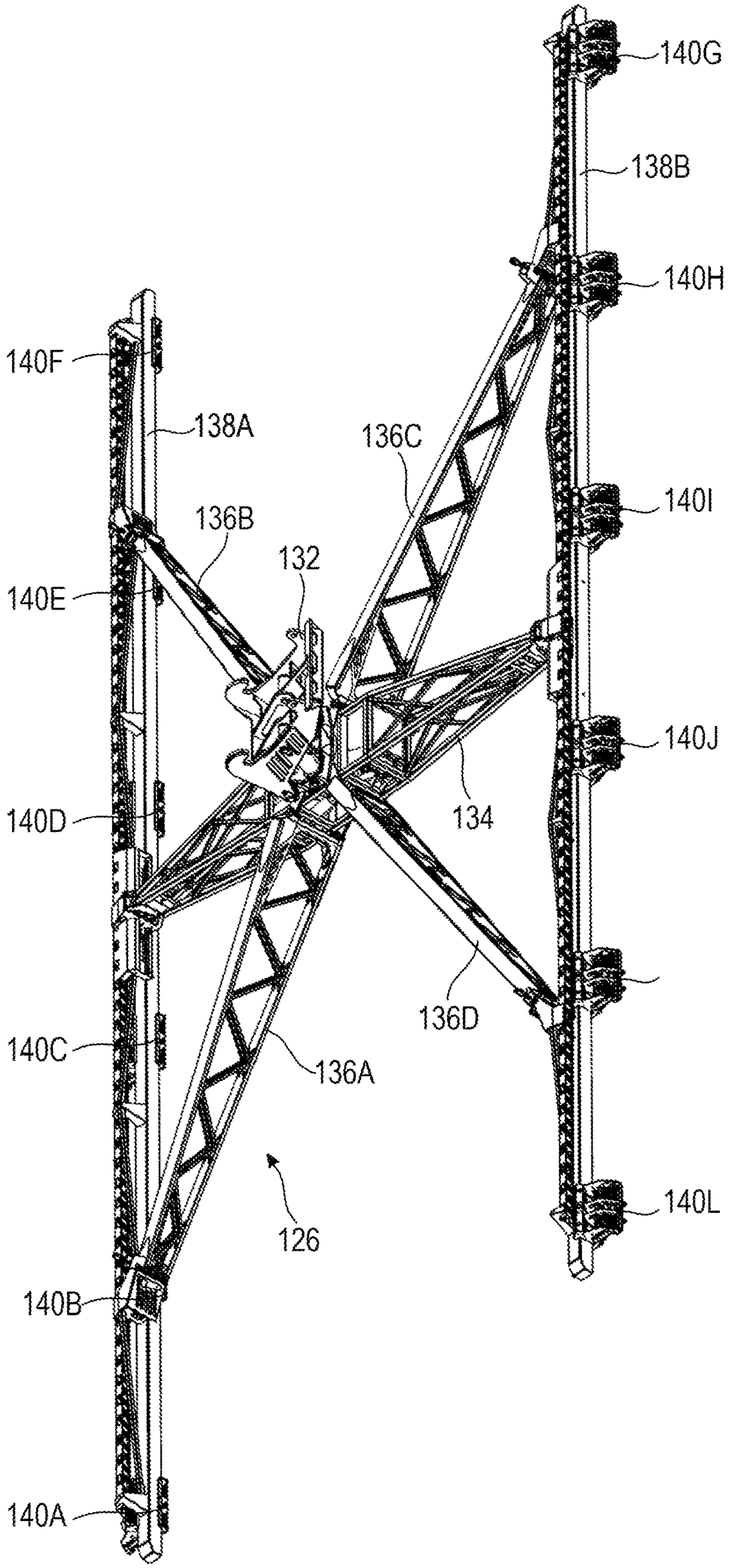
FIG. 6 illustrates a bottom, side perspective view of a boom IMP telehandler attachment.
Figure 7:
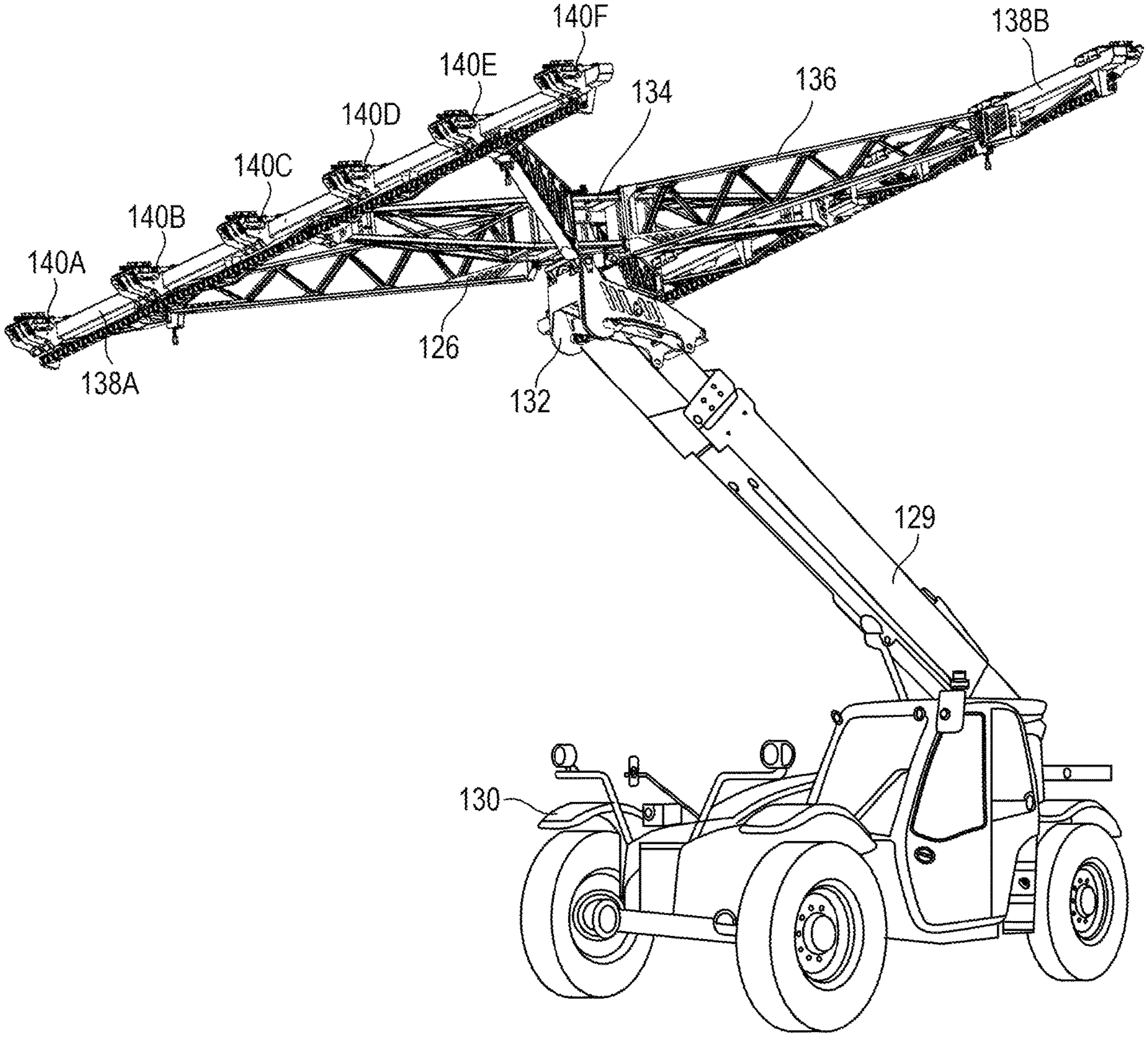
FIG. 7 illustrates a bottom, side perspective view of a boom IMP telehandler attachment coupled to a telehandler.
Figure 8:
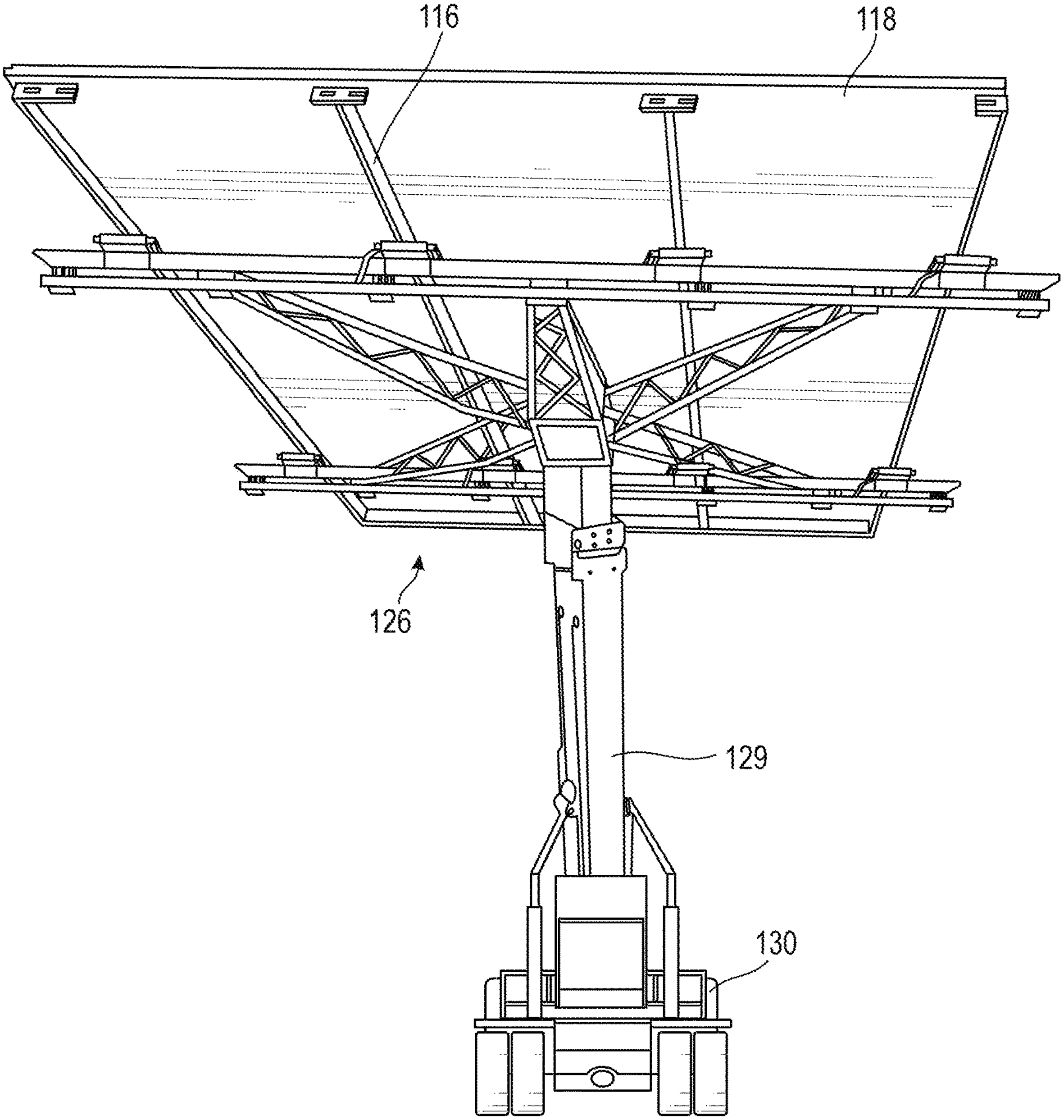
FIG. 8 illustrates a bottom, side perspective view of a boom IMP telehandler attachment lifting a panel module.
Figure 9:
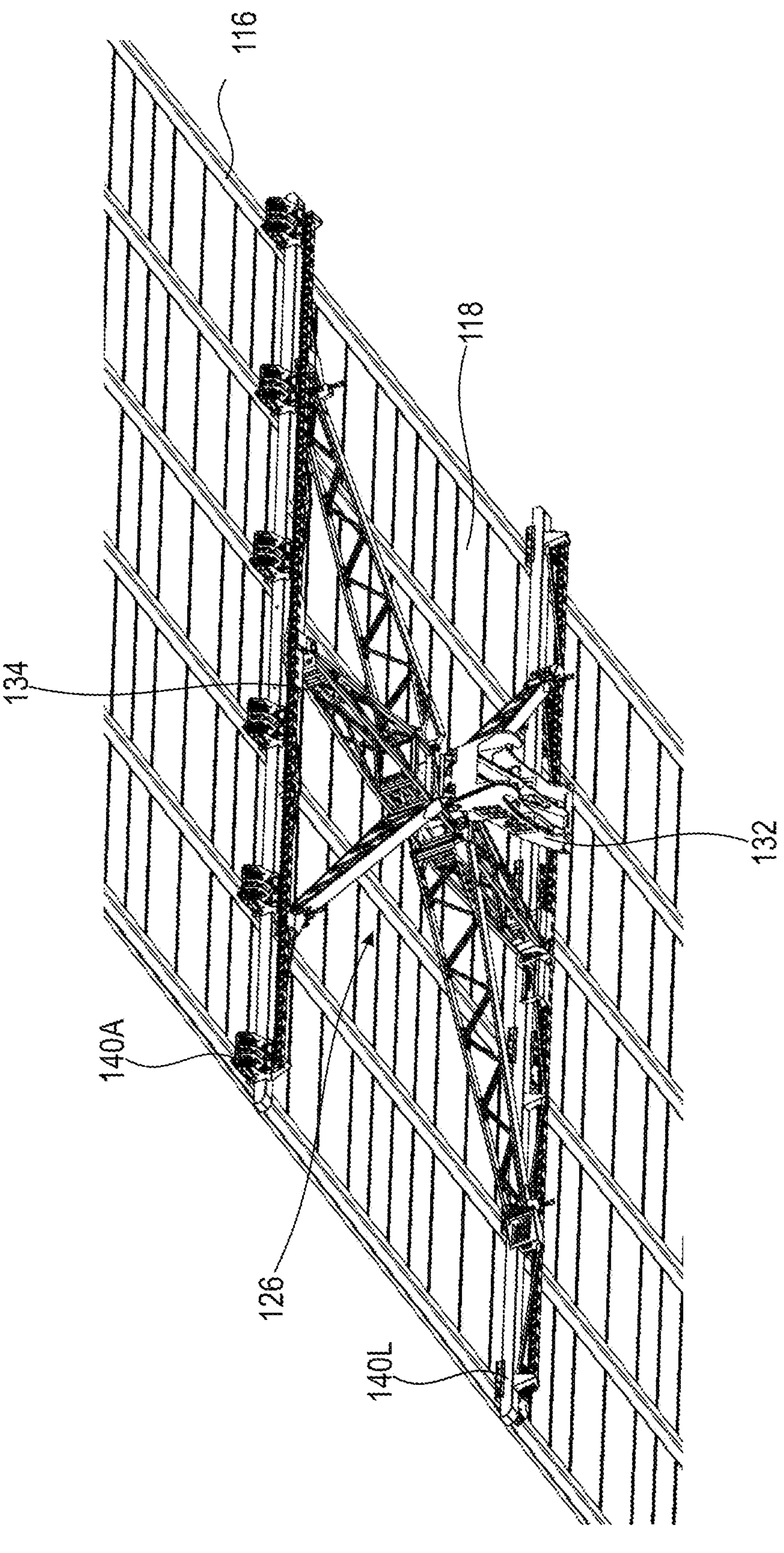
FIG. 9 illustrates a bottom, side perspective view of a boom IMP telehandler attachment coupled to a panel module.
Figure 10:
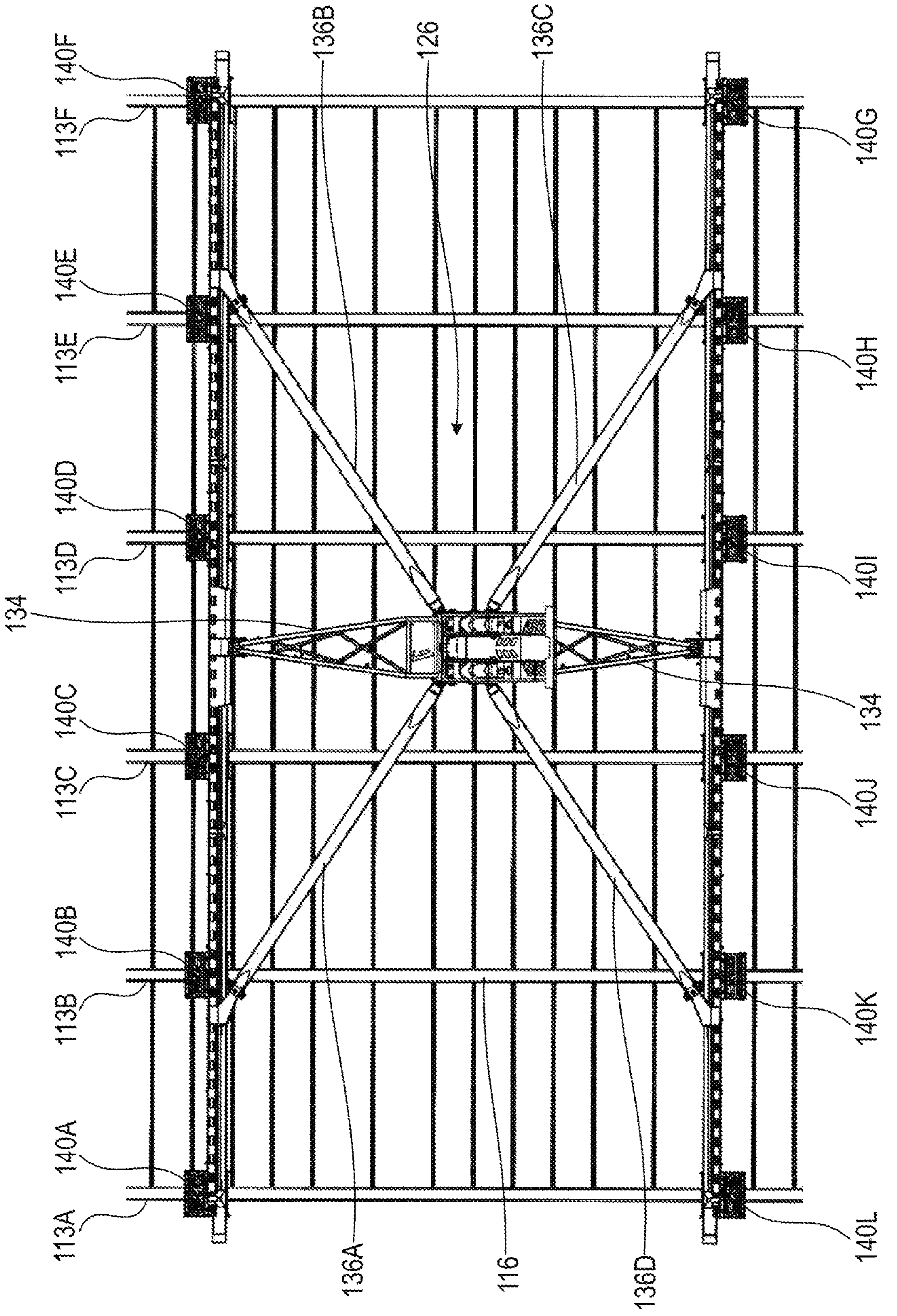
FIG. 10 illustrates a bottom plan view of a boom IMP telehandler attachment having a plurality of clamp assemblies coupled to clamp header rails.

As shown in FIG. 5, once a panel module 118 is assembled (i.e., each panel section 114 is fastened to the panel frame 116 for a desired length/width), the panel jacks 120A-D lift the panel module 118 to a predetermined height (e.g., eleven feet) that is sufficient for a boom 129 and associated accessories of a telehandler 130 to be received thereunder. While the panel jacks 120A-D may be hydraulically or electrically powered scissor lifts 122, 125, as shown, it will be appreciated that jacks, hoists, or other mechanisms known in the art to lift heavy construction materials may be used.

Referring to FIGS. 6-10, in order to lift the panel module 118 from the panel jacks 120A-B, the IMP assembly system 100 further comprises a boom IMP attachment 126 for coupling to the boom 129 of the telehandler 130. The boom IMP attachment 126 comprises a quick-coupler 132, allowing it to couple to the boom 129 of the telehandler 130. Additionally, the boom IMP attachment 126 comprises a jib frame 134, a plurality of jib arms 136A-D, a first clamp header rail 138A, a second clamp header rail 138B opposite the first clamp header rail 138A, and a plurality of clamp assemblies 140A-L. The plurality of clamp assemblies 140A-L may be positioned and secured along the length of the first clamp header rail 138A and the second clamp header rail 138B, respectively, preventing unwanted rotation and maintaining the plurality of clamp assemblies 140A-L positioned on the same geometric plane. As shown, though without limitation, the jib frame 134 extends perpendicularly from the first clamp header rail 138A to the second clamp header rail 138B, while the plurality of jib arms 136A-D act as supporting members that extend tangentially between the first clamp header rail 138A and the second clamp header rail 138B.

Figure 11:
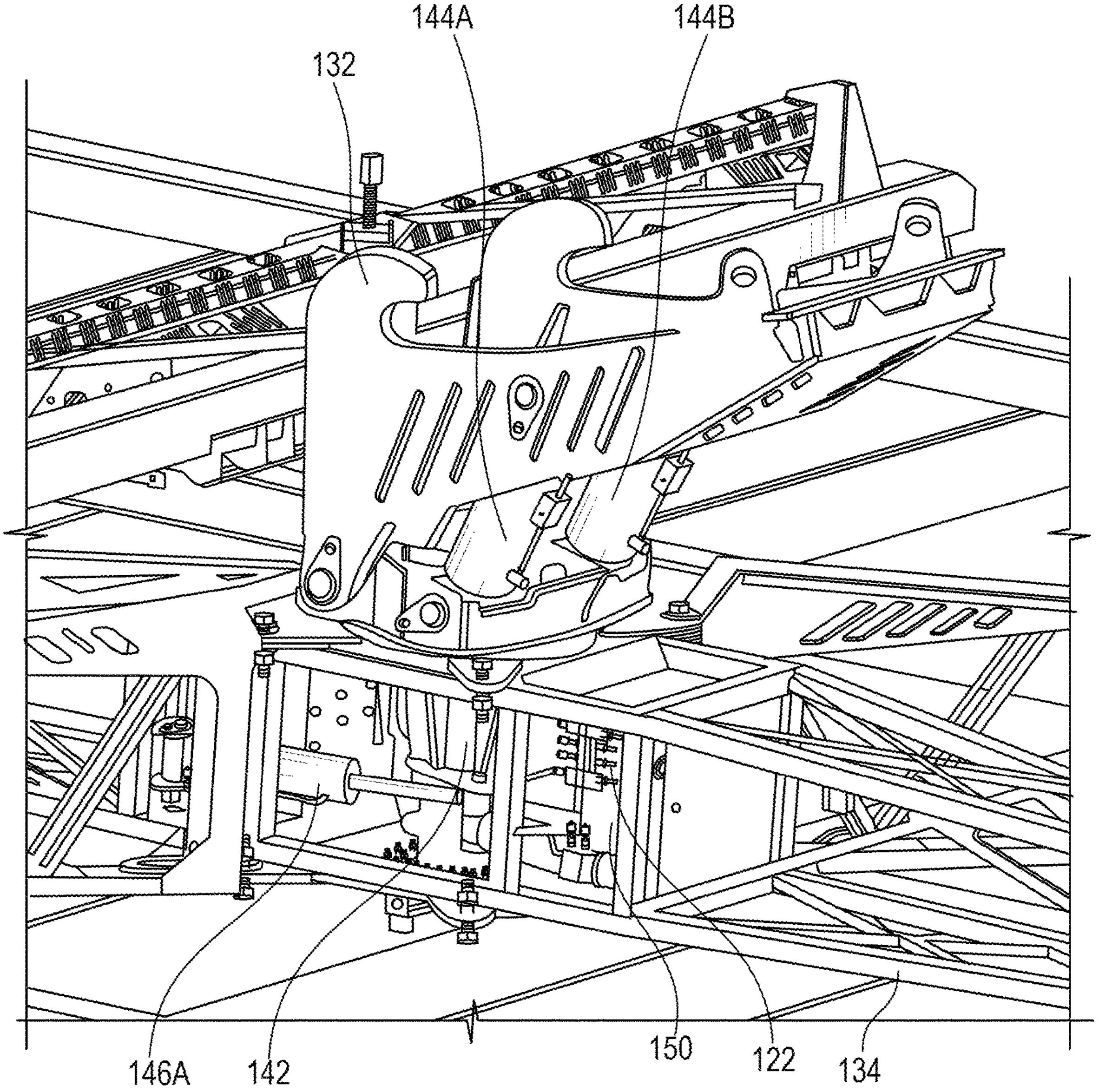
FIG. 11 illustrates a bottom, side perspective view of a boom IMP telehandler attachment having a quick-coupler, tilt linear actuators, and hydraulic rotation linear actuators.
Figure 12:
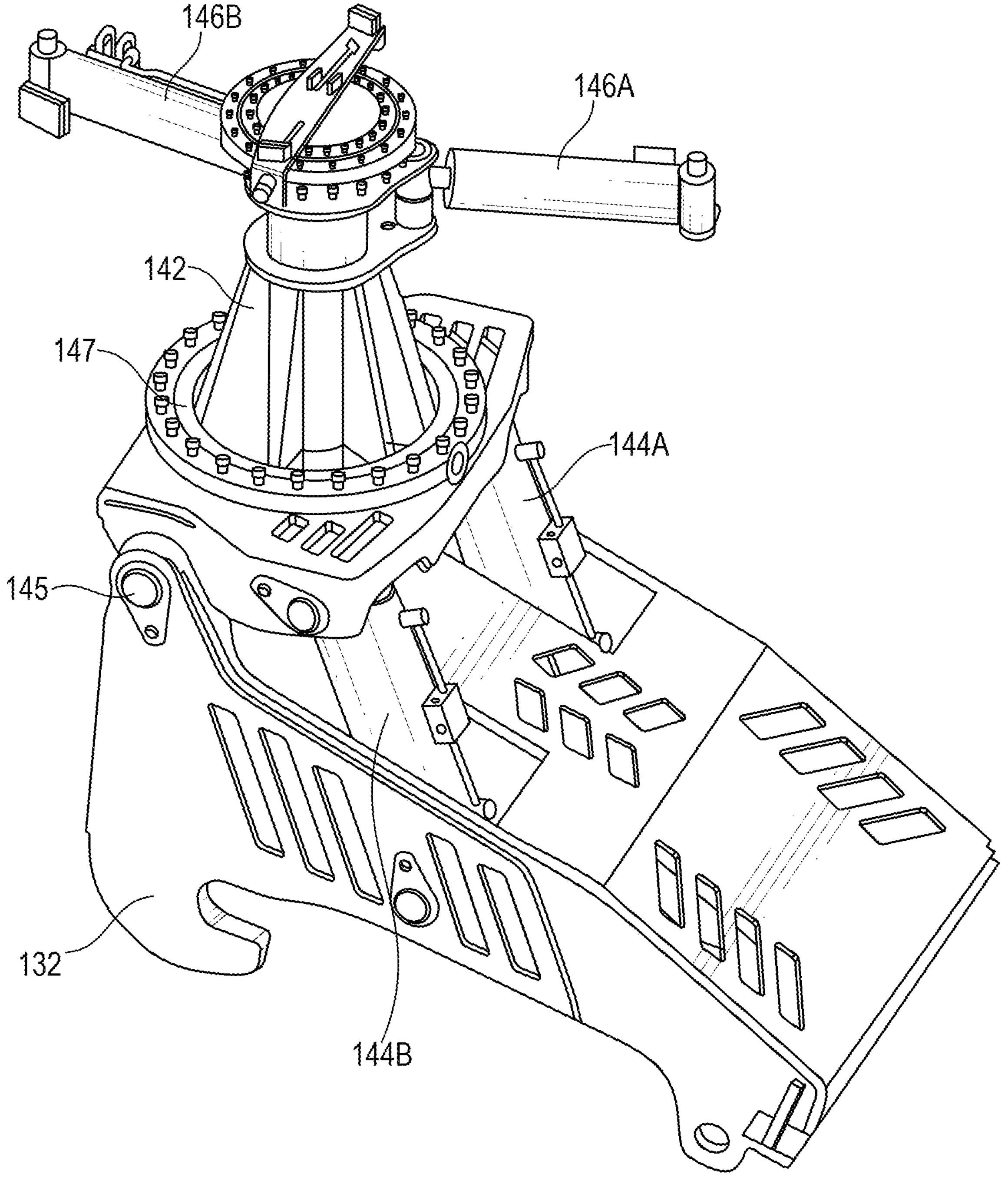
FIG. 12 illustrates a rear, side, bottom perspective view of a boom IMP telehandler attachment having a quick-coupler, tilt linear actuators, and hydraulic rotation linear actuators.

Referring to FIGS. 11-12, the quick-coupler 132 comprises, in some embodiments, a swivel coupler column 142, one or more tilt linear actuators 144A-B configured to tilt the orientation of a panel module 118 (e.g., tilting on a hinge pin 145), one or more hydraulic rotation linear actuators 146A-B configured to rotate the orientation of the panel module 118 (e.g., on a bearing ring 147), and a hydraulic controller 148 to hydraulically couple the respective tilt linear actuators 144A-B and hydraulic rotation linear actuators 146A-B to the hydraulic system of the telehandler 130. The jib frame 134 and jib arms 136A-D are coupled to, and extend from, the swivel coupler column 142, allowing them to swivel/rotate therewith. For example, the first hydraulic rotation linear actuator 146A may be substantially opposite or positioned at an oblique angle to the second hydraulic rotation linear actuator 146B such that the overall range of rotational motion is increased along the opposing directions. When the first hydraulic rotation linear actuator 146A or the second hydraulic rotation linear actuator 146B are actuated, a rotational force is applied against the quick-coupler 132 and by extension the telehandler 130. Accordingly, the first hydraulic rotation linear actuator 146A when actuated may rotate the jib frame 134, via the swivel coupler column 142, in a first direction while the second hydraulic rotation linear actuator 146B when actuated may rotate the jib frame 134 in an opposite, second direction. While hydraulics are shown and described, other mechanisms may be used, such as pneumatic systems or electro-mechanical motors with cogs.

In some embodiments, the boom IMP attachment 126 is capable of rotating the panel module 118 one hundred and fifty degrees from a horizontal position, and tilting the panel module 118 degrees to stand the panel module 118 vertically. However, while specific degrees are provided, it will be appreciated that the present invention is not so limited, and the degrees may be more or less than the above.

Figure 13:
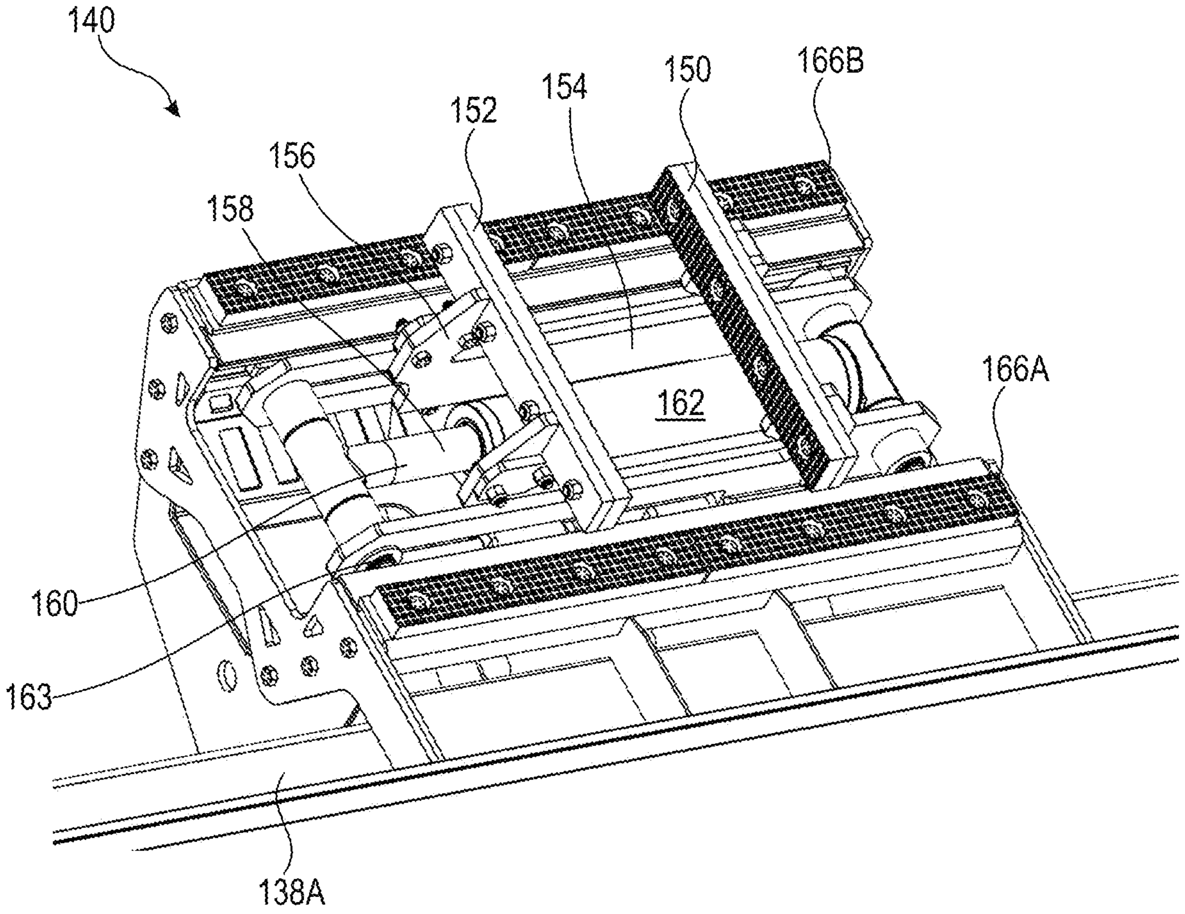
FIG. 13 illustrates a top, side perspective view of a clamp assembly.
Figure 14:
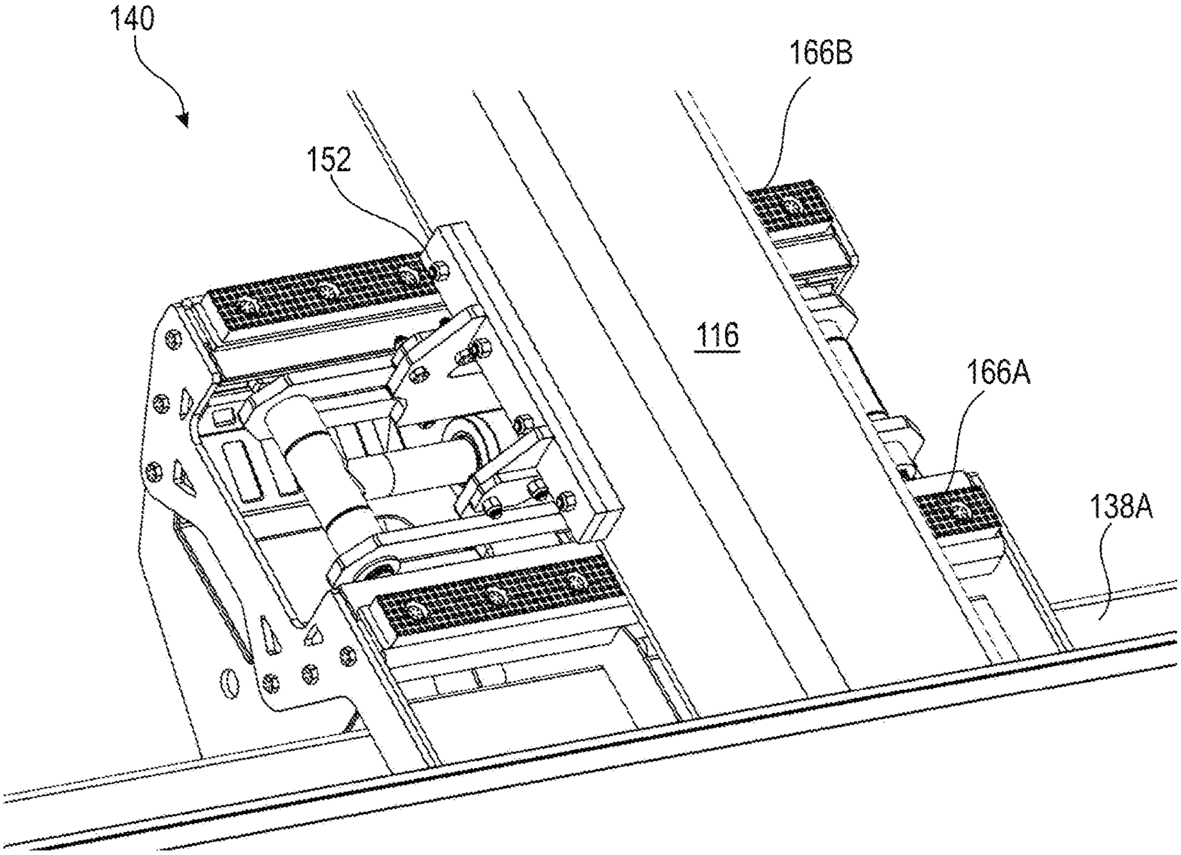
FIG. 14 illustrates a top, side perspective view of a clamp assembly gripping a panel frame.
Figure 15:
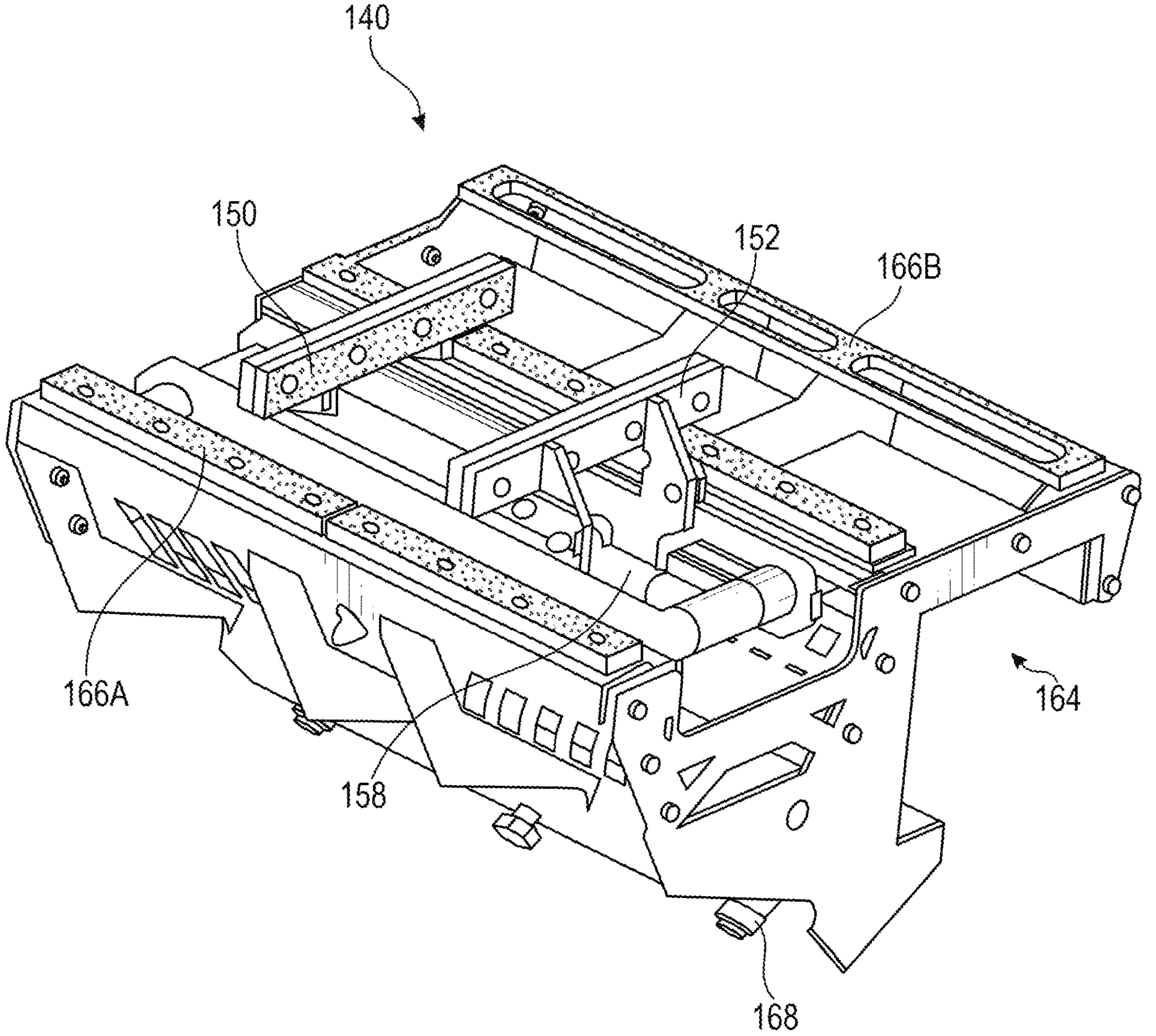
FIG. 15 illustrates a top, side perspective view of a clamp assembly.

Referring now to FIGS. 13-15, in some embodiments, each clamp assembly 140 may comprise a fixed jaw 150 (i.e., immovable), a movable jaw 152 opposite the fixed jaw 150, forming a clamping aperture 154 therebetween, a clamp slide 156 coupling the movable jaw 152 to a clamp linear actuator 158 (e.g., a piston 160 and a cylinder 162). The movable jaw 152 may be secured using bolts or welds to the clamp slide 156. Accordingly, the clamp linear actuator 158 is configured to actuate the movable jaw 152 linearly towards or away from the fixed jaw 150. Therefore, as shown in FIG. 14, the clamping aperture 154 is configured to receive the panel frame 116 therein and to be clamped between the fixed jaw 150 and the movable jaw 152 by actuating the movable jaw 152. While shown and described as having one fixed jaw 150 and one movable jaw 152, it will be appreciated that, in some embodiments, both jaws may be movable using a single clamp linear actuator 158 or using two separate linear actuators 158.

The clamp slide 156 allows for the distance to be varied between the fixed jaw 150 and the movable jaw 152. The clamp slide 156 may be coupled to the piston 160 of the clamp linear actuator 158, such as by using a locking pin 163. The piston 160 may be controlled using hydraulics supplied to the clamp linear actuator 158 using hydraulic ports 168. This allows the operator of the telehandler 130 to decrease the distance, or increase the distance, between the fixed jaw 150 and movable jaw 152, as needed. For example, in some embodiments, as the hydraulic pressure is decreased, the piston 160 moves into the cylinder 162. Because the piston 160 is coupled to the movable jaw 152 via the clamp slide 156, both the clamp slide 156 and the movable jaw 152 coupled thereto move toward the fixed jaw 150.

The distance between the fixed jaw 150 and the movable jaw 152 may be further decreased or increased by selectively coupling the clamp slide 156 via locking pin apertures. In other words, a locking pin may be removed, the clamp slide 156 adjusted as needed, and then the locking pin may be re-inserted into the appropriate locking pin aperture. The locking pin may also pass through (or otherwise be coupled to) the piston 160. It will be appreciated that while referenced herein as fixed jaw 150, it is not required to be fixed (i.e., immovable). In other words, in an alternate embodiment, both the movable jaw 152 and the fixed jaw 150 would be movable and would approximate each other during hydraulic actuation. Further, while hydraulic systems are shown and described, the clamp assemblies 140A-L are not so limited. In other words, electronically controlled mechanisms may be used, including screw drives, a rack and pinion mechanism with an electric motor, or similar methods of linear actuation.

As best shown in FIG. 15, each clamp assembly 140 may further comprise a header aperture 164 to receive one of the clamp header rails 138A, 138B, where it may be secured thereto using bolts, welds, or other securing mechanisms. The header aperture 164 may be rectangular, square, or other shape so as to prevent rotation of the clamp assembly 140 on the clamp header rails 138A-B. Additionally, one or more grip plates 166A-B may have a textured surface and be configured to assist in gripping and supporting the panel module 118. It will be appreciated that the plurality of clamp assemblies 140A-L are modular and may be added or removed from the clamp header rails 138A-B depending on the size of the panel module 118 being assembled. While the fixed jaw 150 and movable jaw 152 are shown with a flat face for abutting the panel frame 116, it will be appreciated that other formfactors may be used. In some embodiments, the plurality of clamp assemblies 140A-L may each comprise a plurality of clamping protrusions that are independently movable using a linear actuator and are designed to grip surfaces other than flat faces, such as an I-beam.

As shown in FIG. 13, each clamp assembly 140 may comprise hydraulic ports 168 so that each clamp assembly 140 is controllable from the hydraulic system of the telehandler 130. Hydraulic hoses may be secured along channels within the first clamp header rail 138A and the second clamp header rail 138B using quick-release pins or other mechanisms. The quick-release pins may be hand positioned by workers to secure any slack in the hydraulic hoses. In other embodiments, the first clamp header rail 138A and the second clamp header rail 138B may comprise integrated conduits, a series of hooks, or other appropriate fasteners, extending throughout the jib frame 134 and the plurality of jib arms 136A-D to secure the hydraulic hoses during use.

Figure 16:
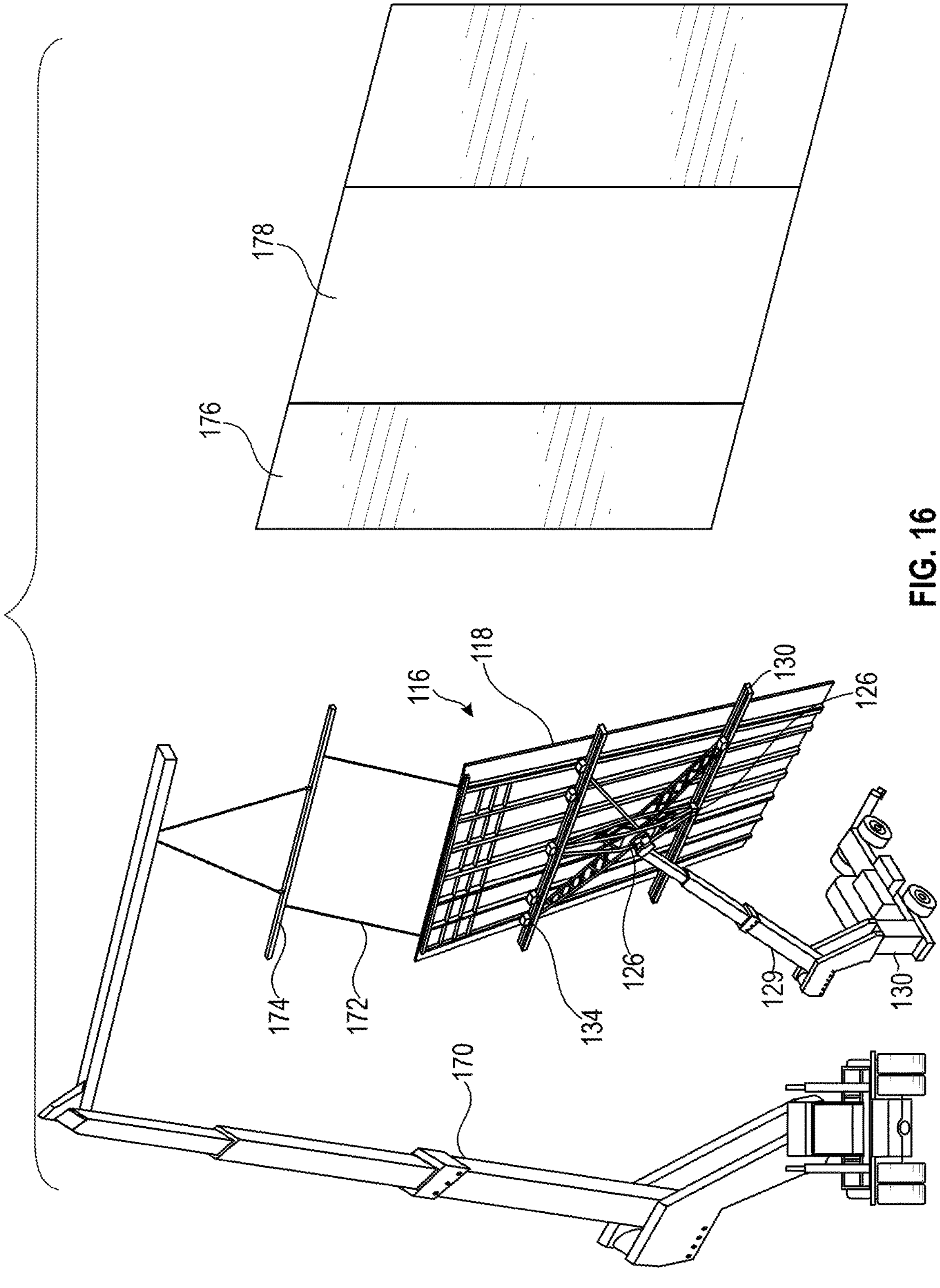
FIG. 16 illustrates a perspective view of a completed panel module being lifted into position on a building by a crane and a telehandler using a boom IMP attachment.

Referring to FIG. 16, once a completed panel module 118 is lifted by a telehandler 130 using the boom IMP attachment 126, it may be transported and then tilted and/or rotated as needed via the tilt linear actuators 144A-B and/or rotation linear actuators 146A-B, respectively. A crane 170 may then be coupled to the panel module 118, while being held by the boom IMP attachment 126, using crane cables 172 and a spreader bar 174 (collectively referred to as a crane rigging assembly). Once the panel module 118 is coupled to the crane rigging assembly, the clamp assemblies 140A-L are actuated to release the panel frame 116, allowing the crane 170 to hoist the panel module 118 into position for securing to an installation location 178, such as an aperture of a building 176. It will be appreciated that the panel module 118 may be structural or may also be a cladding or veneer on an exterior wall of the building 176.

As mentioned, boom IMP attachment 126 may tilt in relation to the boom 129 of the telehandler 130, tilting the panel module 118. The first tilt linear actuator 144A and the second tilt linear actuator 144B are configured to tilt the orientation of the panel module 118 to stand the panel module vertically, or substantially vertically. This allows the panel module 118 to be tilted from the initial position (e.g., horizontal) during assembly along the panel assembly table 102, parallel to the ground, to a final position (e.g., vertical) during installation along the exterior wall or façade of the building 176, perpendicular to the ground. Again, once the telehandler 130 has moved the panel module 118 from the panel assembly table 102 to the installation site, a crane 170 comprising a rigging assembly is coupled to an end of the panel module 118. Upon secure transfer to the crane 170, the boom IMP attachment 126 may be released from the panel module 118. To release the boom IMP attachment 126, the operator widens the clamping apertures 154, thereby releasing the panel module 118. It will be appreciated that the first and second hydraulic rotation cylinders 146A-B allow the jib frame 134 to rotate along an axis. Once the panel module 118 is positioned flush against the wall of the building 176 by the crane 170, workers may fasten the panel module 118 into place using bolts, welds, or other fasteners.

In some embodiments, a method of using an IMP assembly system 100 comprises coupling the quick-coupler 132 of a boom IMP attachment 126 to a telehandler 130. The boom IMP attachment 126 is then positioned beneath a panel module 118 that is formed from panel sections 114 fastened to a panel frame 116 (e.g., studs, beams). Each of the clamp assemblies 140A-L are positioned beneath the panel frame 116 such that the fixed jaw 150 and movable jaw 152 of each clamp assembly 140A-L are on opposite sides of a frame member 113A-F (FIG. 10), with two clamp assemblies 140A-L clamping each frame member 113A-F, respectively. The movable jaw 152 is then actuated, causing the movable jaw 152 to approach the fixed jaw 150, clamping the frame member 113A-F therebetween. As shown in FIG. 16, once clamped, the telehandler 130 may lift the panel module 118 near the desired location for fastening (e.g., to a building 176).

In some embodiments, a crane rigging assembly (comprising crane cables 172 and the spreader bar 174) is coupled to an end of the panel module 118. Once coupled to the crane 170, the boom IMP attachment 126 may be released from the panel module 118. To release the boom IMP attachment 126, the operator opens the clamping aperture to release the frame members 113A-F therein.

The panel frame 116 distributes the weight of the panel module 118 across the boom of the telehandler 130. While frame members 113A-F are shown and described throughout as beams or studs, it will be appreciated that the invention is not so limited. In other words, in addition to grasping frame members 113A-F, the boom IMP attachment 126 can be adapted to handle groups of open web steel joists, I-beams, or other structural members in the same manner. In some applications, such as single-story building and other comparatively short warehouses, the telehandler 130 may position the panel module 118 directly into position along the exterior façade of the building 176 without the assistance of a crane 170. This avenue further reduces risk (cranes have inherit risks) and project costs by removing the costs associated with a crane 170. In other words, the telehandler 130 may position the panel module 118 for securing directly to a building 176, which is not possible in the prior art.

Moreover, it will be appreciated, that assembling the panel module 118 at ground level, rather than multiple stories within the air, minimizes falling hazards, improving worker safety and reducing fatigue caused from working within a harness suspended above the ground. For example, iron workers benefit from reduced aerial time while incorporating steel components such as the panel frame 116 into the panel module 118. Likewise, all material may be better controlled in an ergonomic manner, reducing fatigue and other injury risks. Additional efficiency gains through more productive workflow translate into shorter durations for the overall IMP project scope, closing the building perimeter faster. Another schedule advantage can be achieved in onsite logistics, as most assemblies can be completed away from the building perimeter, improving access for multiple trades and crews, thereby optimizing material staging. The IMP assembly system 100 also contributes to a more simplified perimeter wall system design, removing complex parapet assemblies and wall girts that often affect multiple finishing scopes and present sequencing challenges throughout the construction process. Accordingly, the system and method for installing insulated metal panels disclosed herein solves these problems and others, overcoming the prior art.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An assembly system for installing insulated metal panels (IMP), comprising:
- a boom IMP attachment, comprising:
  - a quick-coupler for coupling to a boom of a telehandler;
  - a swivel coupler column coupled to the quick-coupler;
  - one or more tilt linear actuators configured to tilt an orientation of a panel module in a first axis, the panel module formed from an assembly of a plurality of IMPs to a panel frame;
  - one or more hydraulic rotation linear actuators configured to rotate an orientation the panel module in a second axis;
  - a jib frame coupled to, and extending from, the swivel coupler column;
  - a plurality of jib arms coupled to, and extending from, the swivel coupler column;
  - a first clamp header rail coupled to a first end of the jib frame;
  - a second clamp header rail coupled to an opposite end of the jib frame; and
  - a plurality of clamp assemblies coupled to the first clamp header rail and a plurality of clamp assemblies coupled to the second clamp header rail, each clamp assembly comprising:
    - a fixed jaw,
    - a movable jaw opposite the fixed jaw, and
    - a linear actuator configured to linearly actuate the movable jaw;
  - wherein the jib frame extends perpendicularly from the first clamp header rail to the second clamp header rail and the plurality of jib arms extend tangentially between the first clamp header rail and the second clamp header rail.

2. The assembly system of claim 1, further comprising a hydraulic controller and a plurality of hydraulic ports.

3. The assembly system of claim 1, wherein the plurality of clamp assemblies each comprise one or more grip plates.

4. The assembly system of claim 1, wherein the clamp linear actuator comprises a piston and a cylinder.

5. The assembly system of claim 1, wherein the one or more tilt linear actuators are configured to tilt the panel module from an initial orientation parallel to the ground to a final orientation perpendicular to the ground.

6. The assembly system of claim 1, wherein the one or more hydraulic rotation linear actuators comprise a first hydraulic rotation linear actuators and a second hydraulic rotation linear actuators opposite the first hydraulic rotation linear actuators, each configured to rotate the swivel coupler column in opposite directions via one or more bearings.

7. The assembly system of claim 1, further comprising a panel assembly table.

8. The assembly system of claim 7, wherein the panel assembly table comprises:
- a track;
- a gantry movable along the track;
- a material deck movable along the track;
- a material lift arm coupled to the gantry and configured to collect panel sections from the material deck; and
- at least one panel jack.

9. An assembly system for installing insulated metal panels (IMP), comprising:
- a boom IMP attachment, comprising:
  - a quick-coupler for coupling to a boom of a telehandler;
  - a swivel coupler column coupled to the quick-coupler;
  - one or more tilt linear actuators configured to tilt an orientation of a panel module in a first axis, the panel module formed from an assembly of a plurality of IMPs to a panel frame;
  - one or more hydraulic rotation linear actuators configured to rotate an orientation the panel module in a second axis;
  - a jib frame coupled to, and extending from, the swivel coupler column;
  - a plurality of jib arms coupled to, and extending from, the swivel coupler column;
  - a first clamp header rail coupled to a first end of the jib frame;
  - a second clamp header rail coupled to an opposite end of the jib frame; and
  - a plurality of clamp assemblies coupled to the first clamp header rail and a plurality of clamp assemblies coupled to the second clamp header rail; and
  - wherein the jib frame extends perpendicularly from the first clamp header rail to the second clamp header rail while the plurality of jib arms extend tangentially between the first clamp header rail and the second clamp header rail;
- a panel assembly table, comprising:
  - a track;
  - a gantry movable along the track;
  - a material deck movable along the track;
  - a material lift arm coupled to the gantry and configured to collect panel sections from the material deck; and
  - at least one panel jack.

10. The assembly system of claim 9, wherein the plurality of clamp assemblies each comprise a fixed jaw, a movable jaw opposite the fixed jaw, and a linear actuator configured to linearly actuate the movable jaw.

11. The assembly system of claim 9, wherein the plurality of clamp assemblies each comprise one or more grip plates.

12. The assembly system of claim 9, wherein the one or more tilt linear actuators are configured to tilt the panel module from an initial orientation parallel to the ground to a final orientation perpendicular to the ground.

13. The assembly system of claim 9, wherein the one or more hydraulic rotation linear actuators comprise a first hydraulic rotation linear actuators and a second hydraulic rotation linear actuators opposite the first hydraulic rotation linear actuators, each configured to rotate the swivel coupler column in opposite directions via one or more bearings.

* * * * *